US010035561B2

(12) United States Patent
Spaggiari

(10) Patent No.: US 10,035,561 B2
(45) Date of Patent: Jul. 31, 2018

(54) GEAR MOTOR SYSTEM FOR VEHICLES WITH TWO OR THREE WHEELS, INSTALLABLE COAXIALLY WITH THE BOTTOM BRACKET OF THE VEHICLE AND VEHICLE COMPRISING SAID SYSTEM

(71) Applicant: MS REI S.R.L., Casalmaggiore (CR) (IT)

(72) Inventor: Matteo Spaggiari, Casalmaggiore (IT)

(73) Assignee: BIKEE BIKE S.R.L., Rovereto (TN) (IT)

(*) Notice: Subject to any disclaimer, the term of this patent is extended or adjusted under 35 U.S.C. 154(b) by 0 days.

(21) Appl. No.: 15/105,475

(22) PCT Filed: Dec. 18, 2014

(86) PCT No.: PCT/IB2014/067063
§ 371 (c)(1),
(2) Date: Jun. 16, 2016

(87) PCT Pub. No.: WO2015/092729
PCT Pub. Date: Jun. 25, 2015

(65) Prior Publication Data
US 2016/0332696 A1   Nov. 17, 2016

(30) Foreign Application Priority Data
Dec. 18, 2013   (IT) .............................. PR2013A0101

(51) Int. Cl.
*B62M 6/55* (2010.01)
*H02K 7/116* (2006.01)
*B62M 11/14* (2006.01)

(52) U.S. Cl.
CPC ............ *B62M 6/55* (2013.01); *B62M 11/145* (2013.01); *H02K 7/116* (2013.01)

(58) Field of Classification Search
CPC .................................. B62M 6/55; B62M 6/40
See application file for complete search history.

(56) References Cited

U.S. PATENT DOCUMENTS

| 4,274,023 A | 6/1981 | Lamprey |
| 4,918,344 A | 4/1990 | Chikamori et al. |
| (Continued) | | |

FOREIGN PATENT DOCUMENTS

| DE | 38 26 142 A1 | 2/1989 |
| DE | 196 29 788 A1 | 1/1998 |
| (Continued) | | |

OTHER PUBLICATIONS

International Search Report, dated Oct. 14, 2015, from corresponding PCT Application.

*Primary Examiner* — Kevin Hurley
(74) *Attorney, Agent, or Firm* — Young & Thompson

(57) ABSTRACT

Electric gear motor system for vehicles with two or three wheels, of the type externally installable on the bottom bracket of the vehicle. The system is applied to vehicles with two and three wheels, of the type including a standard bicycle frame with levers and pedal cranks for the transmission of the advancing motion of the vehicle. The gear motor unit is of "outrunner" type, i.e. with rotor outside the stator, and the gear box is of planetary type, nested inside the stator cavity; the system is characterized in that it is installed coaxially with the bottom bracket of the frame, by a hub, suitably shaped so as to be inserted in the cavities of the bottom brackets present on the standard bicycle frames, in a manner such that the revolution axes of the motor, the gear box and the pedal cranks coincide; the motor is situated outside the frame.

20 Claims, 12 Drawing Sheets

(56) References Cited

U.S. PATENT DOCUMENTS

| | | | |
|---|---|---|---|
| 6,296,072 B1 | 10/2001 | Turner | |
| 9,073,601 B2* | 7/2015 | Carolin | B62M 13/00 |
| 9,242,698 B2* | 1/2016 | Frieden | B62M 7/12 |
| 9,509,195 B1* | 11/2016 | Edsinger | H02K 11/22 |
| 2008/0108475 A1 | 5/2008 | Perng | |
| 2010/0263959 A1* | 10/2010 | Hoebel | B62M 6/55 |
| | | | 180/443 |
| 2016/0159435 A1* | 6/2016 | Yehuda | B62M 6/55 |
| | | | 180/220 |
| 2016/0236747 A1* | 8/2016 | Tsailianis | B62M 6/55 |

FOREIGN PATENT DOCUMENTS

| | | |
|---|---|---|
| DE | 10 2009 016 854 A1 | 10/2010 |
| DE | 10 2010 037 017 A1 | 3/2011 |
| DE | 10 2011 089 559 A1 | 6/2013 |
| EP | 1 144 242 A1 | 10/2001 |
| EP | 2 308 436 A1 | 4/2011 |
| EP | 2 463 189 A1 | 6/2012 |
| EP | 2 552 567 A1 | 11/2012 |
| EP | 2 562 071 A1 | 2/2013 |
| EP | 2 615 023 A1 | 7/2013 |
| WO | 30/43259 A1 | 7/2000 |
| WO | 2007/083995 A1 | 7/2007 |
| WO | 2008/120311 A1 | 10/2008 |
| WO | 2009/010943 A2 | 1/2009 |

\* cited by examiner

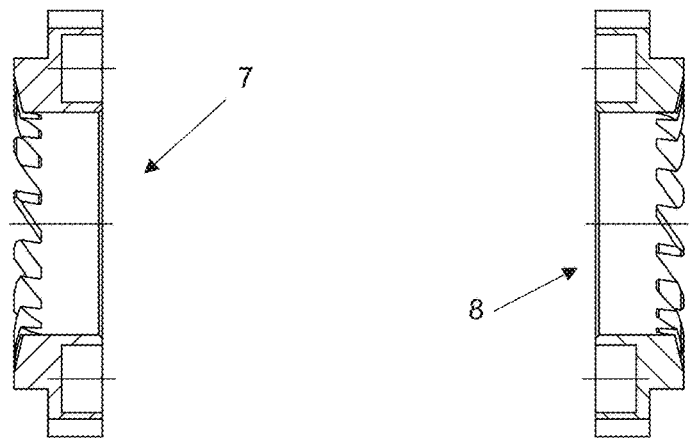
FIG. 2
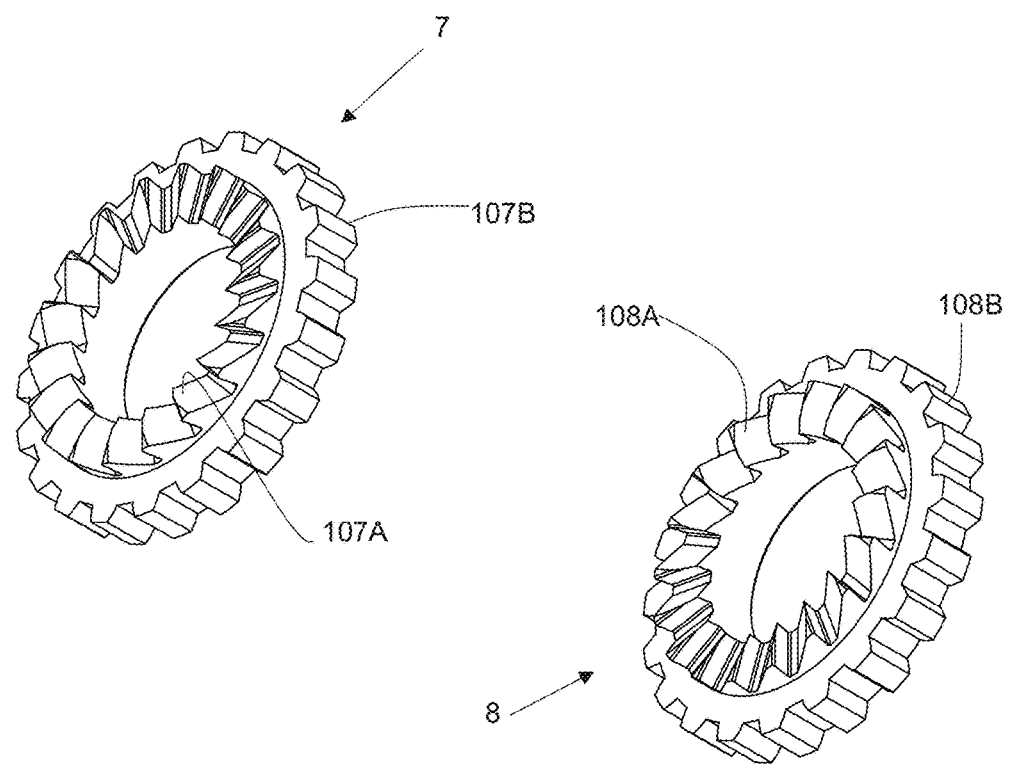

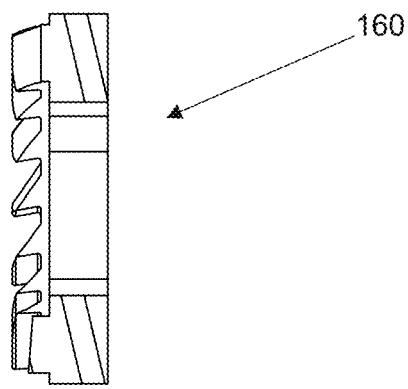
FIG. 6
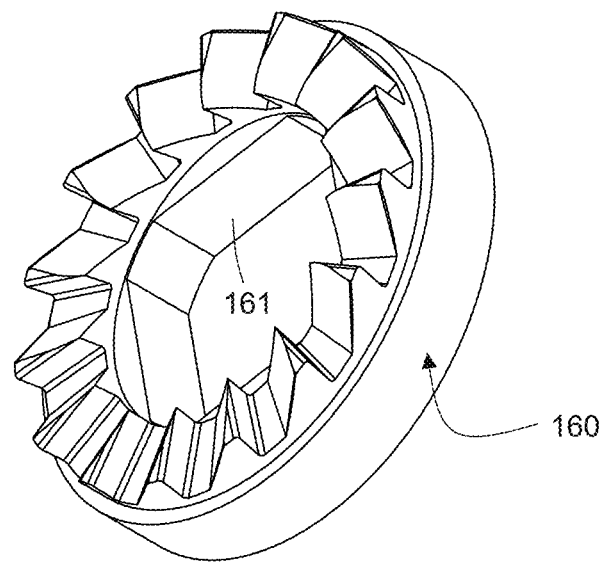

GEAR MOTOR SYSTEM FOR VEHICLES WITH TWO OR THREE WHEELS, INSTALLABLE COAXIALLY WITH THE BOTTOM BRACKET OF THE VEHICLE AND VEHICLE COMPRISING SAID SYSTEM

FIELD OF APPLICATION OF THE INVENTION

The present finding is inserted in the field of electric propulsion systems for vehicles with two or three wheels, in particular bicycles or tricycles.

STATE OF THE ART

Until a few years ago, the electric motors for electric bicycles were typically installed in the hub of the wheels (termed "HUB motors" or "direct HUB" or "drive wheel"), in a manner so as to exploit a space that is otherwise not used, and due to the volume required for these motors.

Over the years, these motors have started to show their limits. Indeed, typically being brushless motors with external rotor with the magnets directly fixed to the hub of the wheel and without reduction stages, the motors absorbed a lot of current in order to produce the necessary torque. In addition, the lack of torque hinders the electric bicycles from taking on significant ascents (e.g.: with greater than 20% slope).

Subsequently, in order to remedy this problem, brushless motors have been introduced in which the coupling with the hub of the wheel was no longer direct, but the motion was reduced through epicyclic stages (e.g. EP2 308 436 A1). Such epicyclic stages are placed laterally with respect to the active part of the motor, in a coaxial manner. This expedient allows reducing the size and bulk (and hence the costs) with respect to the motors without reduction stages, due to the fact that the motors, being able to rotate at higher speeds (e.g. 1000-2000 revolutions per minute) require a lower drive torque given the same delivered power, and consequently lower currents in the lower windings.

Such configuration of the motor placed on the hub with one or two epicyclic reduction stages is commonly defined "planetary hub" and involves several disadvantages. The first disadvantage is that the bulk volume of the epicyclic stages removes precious space from the active part of the motor, i.e. that intended to produce energy (stator, rotor, winding). The second disadvantage is that the transmission, while reduced, may rely on a single fixed reduction ratio, and thus the motor is obliged to operate within a wide interval of the rotational conditions (e.g.: from 0 to 2000 revolutions per minute), diverging greatly and most of the time from the conditions that ensure maximum efficiency.

The axial size of the rear hub of a bicycle is limited (in most cases smaller than 150 mm). The solution of the motor with epicyclic stages has to divide such limited bulk between the wheels of the ring gears, the epicyclic stages and the active part of the motor (stator, winding, rotor). It is also necessary to consider that the planetary system employed in such solution places a limit on the maximum reduction ratio obtainable due to the limited bulk, which usually ranges from 3:1 to 5:1 for each reduction stage.

These combined factors ensure that such system, even if improved, it still not able to fully exploit the intrinsic potentialities of the electric motor. Indeed, the electric motor tends to have optimal weight/power, bulk/power ratios in a range from 2000 to 4000 revolutions per minute, which such system is unable to attain. Considering in fact that typically the rear wheel of an electric bicycle completes from 60 to 300 revolutions per minute at maximum speed, the required reduction ratios should be in the range of 6:1-66:1. Such ratios are hard to obtain with one or more epicyclic reduction stages, in consideration of the bulk constraints of the rear hub of the wheel of the bicycle and the requested transmitted torques.

In order to overcome this barrier, the systems "with bottom bracket" have recently appeared in which the electric motor is no longer installed on the hub of the wheel, but rather in proximity to the bottom bracket of the bicycle itself, thus transmitting the delivered torque, by means of gears with toothed wheels or transmissions with chains, to the ring gears on which the bicycle chain is engaged.

This configuration (termed "mid-drive" or "crank drive") offers the advantage of being able to rotate the motor at a number of revolutions closer to the optimal number (2000-4000 revolutions per minute) and to rely on a subsequent reduction stage/chain wheel (that of the bicycle itself, composed of one or more ring gears, transmission chain and one or more sprocket wheels integral with the hub of the rear wheel, to which the term 'secondary transmission' 302 makes reference) which allows maintaining the electric motor in the rotation range closest to maximum efficiency.

These advantages translate into motors with more limited size, smaller current consumptions and thus greater autonomy given the same battery pack (e.g.: EP2615023 (A1)—Jul. 17, 2013, WO2008120311 (A1), WO 00/43259)

Nevertheless, the "Mid drive" configuration brings with it several disadvantages: the complexity with respect to the motors positioned on the hub is increased, along with the bulk and weight required by the primary transmission system (which transmits the motion from the electric motor to the bottom bracket of the bicycle), which oblige seeking new solutions for positioning the motor-transmission unit.

The best currently-existing solutions seek a compromise between the contrasting needs to obtain minimum bulk (compatible with the daily use of the bicycle) and high torque available at the wheel (which requires the use of motors or primary transmissions of larger size), of course while seeking to minimize costs.

The abovementioned patent (EP2615023) and others (e.g.: DE102011089559) rely on high primary reduction ratios for obtaining high available torque, to the detriment of the bulk. Accepting therefore the disadvantage of having bulk volumes of the oversize bicycle that are considerably increased, there is the advantage of an electric propulsion system which ensures high torque together with high efficiency. Some of these systems introduce another limitation for the diffusion thereof: they require a bicycle which has a frame created especially for receiving the devices (WO 00/43259). While anyone can install, on one's conventional bicycle, a motor placed on the hub of the rear wheel, thus transforming it into an electric bicycle, now it is no longer possible to convert an existing bicycle with these systems.

Other systems (e.g.: EP2463189 A1 and EP1144242 (A1)—Oct. 17, 2001) seek limited bulk by housing the motor coaxially with the bottom bracket, between the pedals of the bicycle. This prevents oversize masses, but once again introduces the constraint of axial size of the motor unit, as with the motor-wheel system examined at the start of this section. Indeed, these systems must ensure limited axial and radial bulk (e.g. axially less than 100 mm and radially less than 200 mm), which prevent the obtainment of high primary reduction ratios (pedal motor—ring gear) due to the bulk required by possible epicyclic stages, and hence preventing the delivery of high torques to the wheel. For this reason, some manufacturers present solutions in which the bulk of the motor is limited by compensating with epicyclic reduction stages (U.S. Pat. No. 6,296,072), a configuration known with the name of "epicyclic mid drive", and other solutions that aim to maximize the size of the motor, excluding the primary reduction and/or using the axial flux configuration (EP2562071 A1) lacking reduction stages, similar to those that are the object of the present invention.

In the attempts to combine the advantages of the coaxial motor with multiple epicyclic reduction stages (e.g.: EP2463189 and U.S. Pat. No. 6,296,072), the maximum power is limited by the limited size of the active elements of the motor (diameter of the rotor, axial length of the stator pack, volume of the winding heads) which must coexist with the epicyclic stages and by the maximum supportable torque of the toothed wheels, with limited axial bulk.

Most of the motors analyzed in this brief section have maximum powers limited to 250 W. The maximum power constraint has never been a big problem, since in most of Europe the law prohibits electric bicycles from delivering greater powers. With the increasing interest in electric bicycles by countries with higher legal power limits for electric bicycles (e.g. USA, where the maximum power limit deliverable by an electric bike is 750 W), and the European law that authorizes the sale of electric bikes with greater power for a different use with respect to that on public roads, the maximum obtainable power constraint becomes increasingly penalizing.

It must be considered that some of the above-described systems can come to deliver, for brief periods, powers that are even greater than 250 W (e.g.: 1000 W), but the efficiency and hence the autonomy would be severely penalized.

Exposition and Advantages of the Finding

A first object of the present invention is to provide the art with a propulsion system that is capable of obtaining a high level of motor efficiency in many different situations (e.g. greater than 80% with moderate speed on flat ground, moderate speed on sharp ascents, high speed on flat ground, high speed on sharp slopes) by using a central system with respect to the vehicle (commonly termed "mid-drive"), in order to obtain a greater autonomy of the vehicle.

Another object of the present invention is to provide the art with a propulsion system that is capable of providing the electric vehicle with the drive torque necessary for confronting sharp ascents (e.g.: greater than 30% slope) by means of a high primary reduction ratio.

Further object of the present invention is to provide the art with a propulsion system that is capable of obtaining the maximum torque/volume ratio of the system by minimizing the bulk of the primary transmission.

Another object of the present invention is to provide the art with the above-described advantages, to all existing vehicles, not yet provided with electric propulsion.

Said objects and advantages are all achieved by the electric gear motor system for vehicles with two or three wheels (e.g.: electric bicycle, electric scooter, tricycle) installable coaxially with the bottom bracket of the vehicle itself, object of the present finding, which is characterized with regard to that provided in the below-reported claims.

BRIEF DESCRIPTION OF THE FIGURES

This and other characteristics will be clearer from the following description of several illustrated embodiments, merely by way of a non-limited example in the enclosed drawings tables.

FIGS. 2, 3, 4 and 6: illustrate structural details of several components of the system pursuant to FIG. 1, FIG. 5: illustrates a second exemplifying scheme of application of the finding in configuration outside the bottom bracket.

DESCRIPTION OF THE INVENTION

Figure 1:
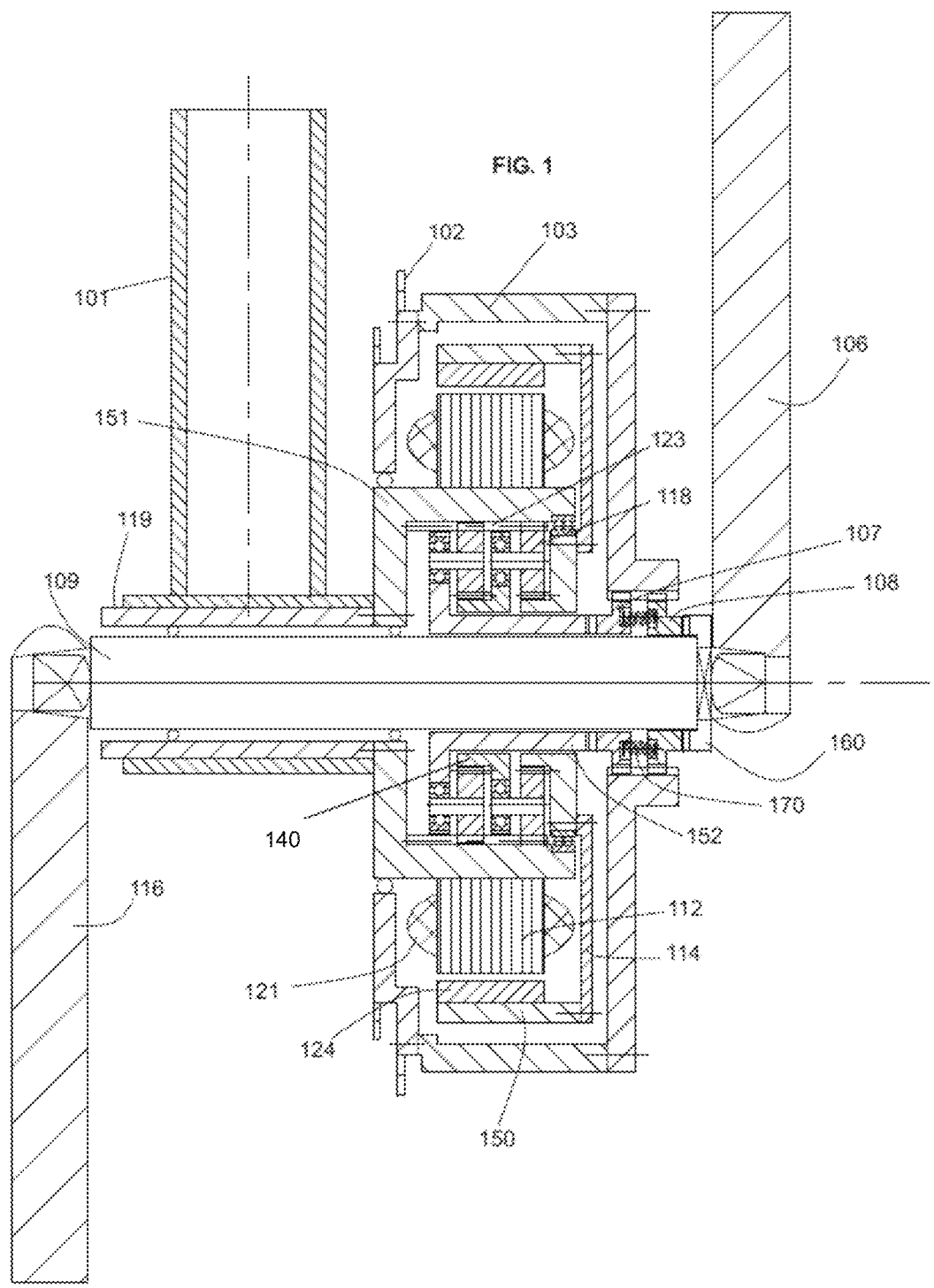
FIG. 1: illustrates a first embodiment of the finding, configuration outside the standard frame of a vehicle with two wheels, in the embodiment a bicycle.

Before describing the finding in detail, it is necessary to first make several observations.

In general, in order to increase the power (torque*speed) of an electric motor, it is necessary to increase the torque and/or speed thereof. The torque is an exponential function of the diameter of the rotor, with exponent of about 2.5, while the optimal speed ranges from 2000 to 3000 revolutions: beyond such conditions, constant losses are verified due to hysteresis in the plate (proportional to the square of the excitation frequency of the windings), which increase the temperature of the motor, consequently increasing the resistance of the copper wire of the winding and thus quickly deteriorating motor efficiency.

In order to obtain the maximum torque from the motor, given the same length of the stator pack, we must therefore have a rotor with maximum size. The torque produced by a brushless motor is in fact an exponential function of the diameter of the rotor in order to increase the arm of the electromagnetic force produced and to increase the surface area available to receive the magnets. This increase of size of the rotor nevertheless contrasts with the need to have limited bulk.

In order to optimize the drive torque/volume ratio, the present invention exploits the brushless motors with external rotor (also termed "outrunner") or alternatively the brushless motors with "axial flux".

In the first motor type, the rotor is situated outside the stator, so that given the same radial and axial bulk, they are able to deliver higher torques (higher by a factor that varies from 2 to 4).

In the second motor type, the rotor is constituted by a flat disc, axially alongside the stator; on such disc, flat magnets are housed having the form of circular sectors (see EP 2562071 A1).

The axial flux motor type is called thus because, contrary to the first "outrunner" type in which the linked flux of the stator flows perpendicular to the shaft motor, in the axial flux motors the flow flows parallel to the shaft motor.

Both types allow obtaining a rotor with size greater than the stator internal diameter, and hence optimizing the drive torque/volume ratio.

For exposition simplicity, the invention will only be illustrated in the "outrunner" motor with radial flux, which represents greater complexity.

Nevertheless, the requested protection is also extended to the version with axial flux. In other words, hereinbelow, the "outrunner" motor will be mentioned, intending both motor types (that with radial flux and that with axial flux) i.e. characterized in that the maximum rotor diameter on which the permanent magnets are housed is greater than the maximum diameter of the maximum stator cavity.

For a given electric motor, the torque is a linear function of the absorbed current: the intrinsic capacity of the present invention to deliver greater torques implies a lower current request by the batteries. Lower current signifies a higher efficiency since there will be lower resistive losses in the winding (proportional to the square of the current, according to the known Joule law).

In terms of power density, i.e. power ratio per unit of volume, and torque density, i.e. drive torque per unit of volume, the present invention integrates the advantages of the "outrunner" architecture of the electric motor with an extremely compact primary reduction system, which is described below.

First Embodiment

FIGS. 1, 2, 3, 4 illustrate a first embodiment of the gear motor system for electric vehicles with two and three wheels, object of the finding.

First of all, it should be stated that the two embodiments described and claimed herein both maintain a same concept of motor installed at the bottom bracket, hence on the shaft of the pedal cranks, and outside the frame. This indicates that, even if the hub 19, 119 is inserted within the cylindrical space present on standard bicycle frames 1, 101 adapted to house bottom bracket, the motor and the gear box are positioned on the side of the frame.

Specifically, the electric gear motor system for vehicles with two and three wheels, comprises:
 a gear motor unit in which the motor is of "outrunner" type, i.e. with rotor outside the stator,
 the gear box is of planetary type;
 the gear box is nested inside the stator cavity;

The system is installed on standard bicycle frames coaxially with the bottom bracket, in a manner such that the revolution axes of the motor, gear box and pedal cranks coincide.

As is known, the planetary gear box is a mechanical member that, through a simple mechanism, is able to modify the speed ratios between the input shaft and the output shaft.

A sun gear, a planetary gear case and a ring gear with internal toothing transmit the motion due to planetary gears, rotating with interaxis fixed and integral with the planetary gear case.

The system of the first embodiment is constituted by a gear motor unit in which the motor is of "outrunner" type, i.e. with rotor (formed by the elements 124, 150, 114) situated outside the stator (element indicated with the reference number 112), and the gear box is of planetary type and is nested inside the cavity of the stator 112.

The stator 112 is fixed, integral with the frame 101 of the vehicle, and constituted by a plurality of suitably-shaped plates for the purpose of housing a plurality of windings 121.

A central shaft 109 traverses the frame 101 and the gear motor and bears, at the ends, the pedal cranks 106 of the vehicle, which in turn will bear the pedals (not shown).

The stator 112 corresponds with a rotor formed by the magnets 124, integral with the rotor ring gear 150 in turn connected by means of the rotor flange 114 with the train of planetary gears 118 of the planetary gear box.

Specifically, the gear sets of the planetary system 118 mesh both with the internal and toothed portion 123 of a cup 151, which thus acts as a ring gear for all the reduction stages, and with the sun gears of the subsequent stages, in the end transmitting the motion to a planetary gear case of the final stage, that indicated with 152, which has a hollow shape, at whose interior the shaft 109 slides and is free to rotate.

In the embodiment, the planetary gear case of the final stage 152 corresponds with the second stage; nevertheless, there may also be a different number of stages (i.e. not two stages).

The cup 151 is integral on one side with the frame 101 by means of the hub 109, while on the other side it is open for the mounting of the planetary gears and the planetary gear case 118 of the various reduction stages.

The cup 151 has a hole for allowing the passage of the shaft 109, and possible bearings, identifiable in the figures with circles in order to simplify the representation.

Figure 3:
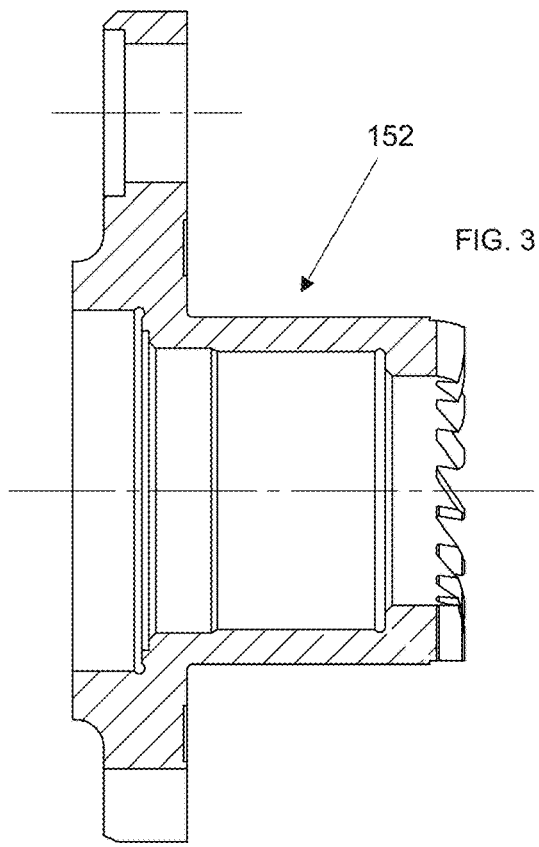
Figure 4:
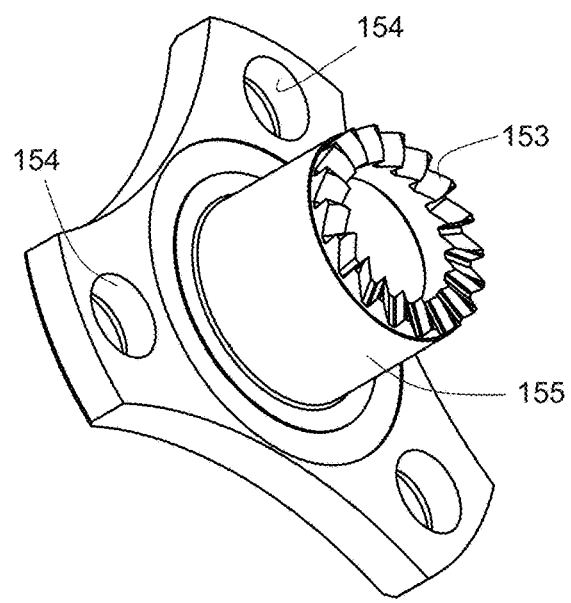

The second-stage planetary gear case 152 is illustrated in detail in FIGS. 3 and 4; it consists of a hollow cylindrical body 155 within which the shaft 109 is free to rotate. Said cylindrical body 155 has three flanges 156, each bearing a hole 154; the planetary gears 118 of the planetary gear sets are mounted on the hole.

The second-stage planetary gear case 152 is therefore coaxial with the shaft 109 and allows transmitting the output power of the gear box to the bell-shaped element 103 through a series of front connections 153.

It is in fact observed that at the head of the body 155, i.e. at the end portion, teeth 153 are present, connection teeth substantially with sawtooth form, in a manner so as to allow the actuation or driving of a corresponding first toothed ring 107, in only one rotation/actuation sense.

The ring 107 in turn has both the front teeth 107A, i.e. axial teeth, adapted to mesh with the corresponding teeth 153, and radial teeth 107B, always meshing with a grooved profile of the element 103, external casing that is thus rotated by the planetary gear case 152 and ring 107.

An analogous though different ring 108 is present alongside ring 107; ring 108 is also provided with axial teeth 108A and radial teeth 108B, the latter meshing the same grooved profile 103A of the element 103.

Said second ring 108 can in turn be driven by a toothed element 160, illustrated in FIG. 6, in only one rotation/actuation sense.

Such toothed element 160 is integral with the shaft 109 by means of a coupling with square seat 161; said element 160 allows the unidirectional front meshing between 108 and the pedal crank 106.

For such purpose, the toothed rings 107 and 108 provided with teeth, both axially and radially, can slide along the shaft 109 and are held compressed, i.e. they are thrust, by an elastic element such as an intermediate spring 170 adapted to maintain them in contact against the corresponding teeth of the elements 152 and 160.

The arrangement of the axial teeth 107A and 108A is mirror-like i.e. reciprocal, in the sense that when the motor rotates, the element 107 can mesh with the second-stage planetary gear case 152, and given that the element 107 is always engaged with the external casing, reference 103, element 107 can actuate the ring gears 102 of the vehicle. In such situation, the set rotation of the ring 108 by the casing 103 does not induce the pedal cranks to rotate since the meshing of the teeth of the element 108 with the gear 160 is free, as if this was a free wheel. The intermediate spring allows the axial disengagement of the teeth 108A.

In the opposite case, i.e. manual non-electric pedaling, the element 108 receives the motion through the levers 106 by means of front connection of the element 160 with square seat, which thus becomes integral with the shaft 109; in this situation, the ring 108, by means of teeth 108B, engages the grooved profile of external casing 103 and hence the ring gears 102 are rotated. As in the preceding case, the ring 107 can now be free from the corresponding meshing with the teeth 53 of the planetary gear case 152. The ring 107 is radially driven, however the front connection works as a free wheel and hence the motor does not rotate—the spring is compressed with each passage of its tooth on the reciprocal tooth.

Second Embodiment

Figure 10:
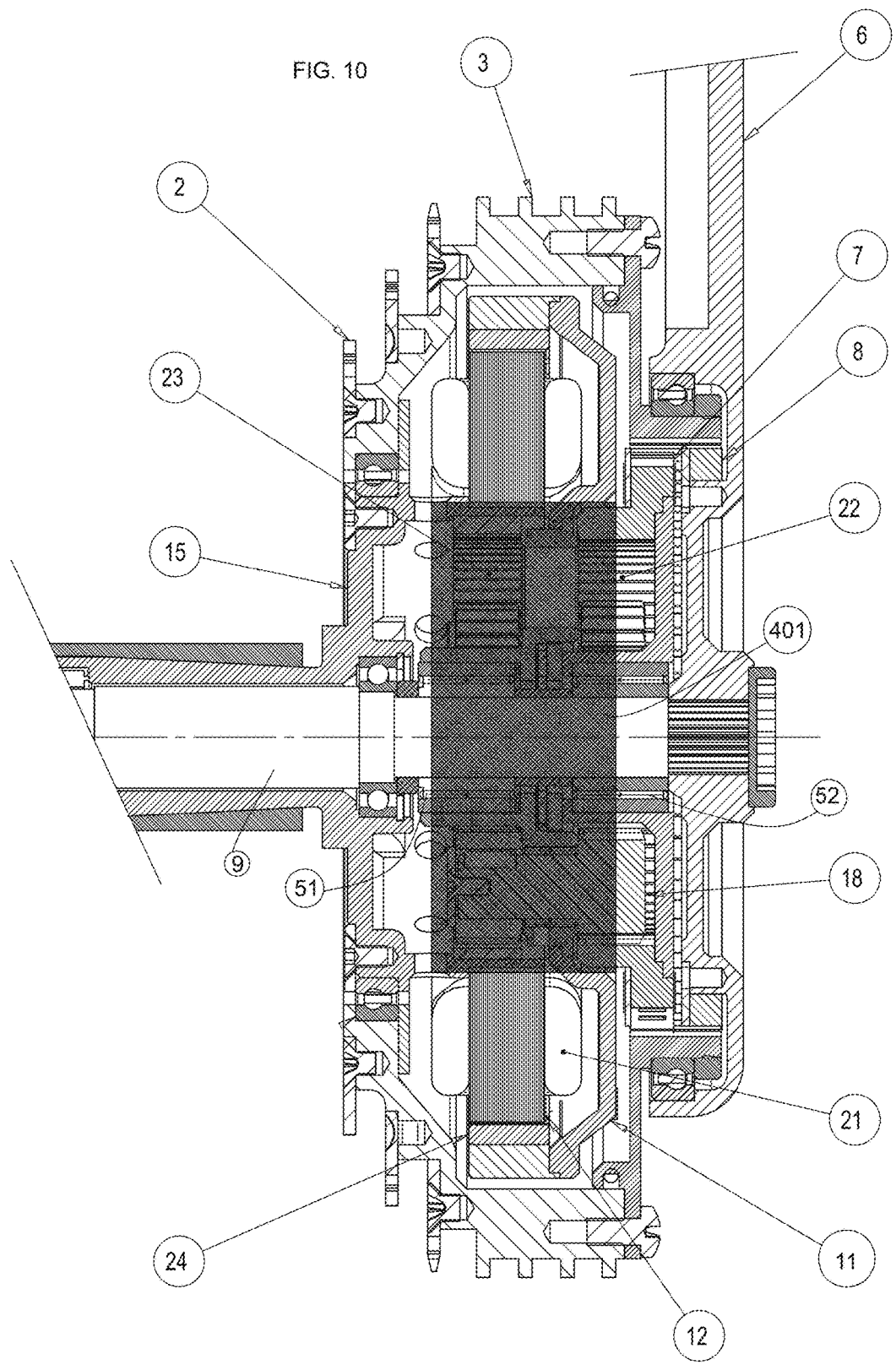
FIG. 10: illustrates the hypothetical volume in which at least one of the toothed wheels of the gear box is totally or partially enclosed.
Figure 11:
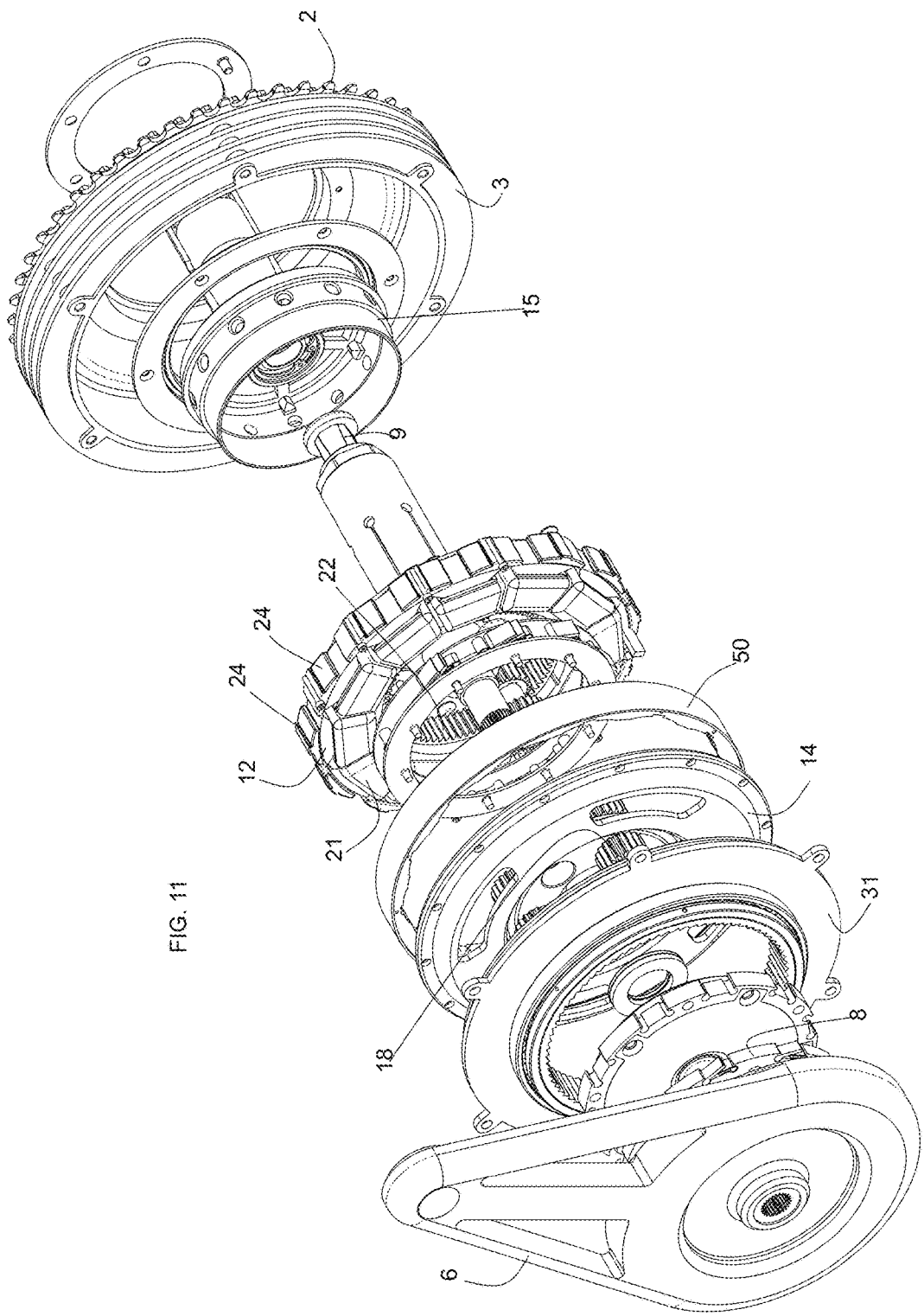
FIG. 11: illustrates the system, object of the finding, in exploded configuration.

The second embodiment of the gear motor system for electric vehicles with two and three wheels, object of the finding, is now illustrated. It is of the type installable coaxially with the bottom bracket of the vehicle itself and comprises a gear motor unit formed by:

a. a fixed stator 12, integral with the frame 1 of the vehicle, and constituted by a plurality of plates that are suitably shaped for the purpose of housing a plurality of windings 21, b. a shaft 9 on which turning pairs are housed that support and on which at least the following coaxially rotate:

c. a ring gear 22 and d. a rotor 11 having the average diameter on which the magnets 24 are housed greater than the maximum stator internal diameter, i.e. greater than the maximum size of the stator cavity if it is not circular, in turn the rotor is constituted by:

i. a rotor ring gear 50 on which the following are fixed:
ii. a plurality of permanent magnets 24, supported by
iii. a rotor flange 14, also termed hereinbelow as a planetary gear case or train case; said rotor flange 14 rotates coaxially with the shaft 9 and acts as a planetary gear case since the following are constrained thereon by means of turning pairs 54:

c. a plurality of planetary gears 18 constituted by toothed wheels 10 and 29 which are engaged inside a plurality of internal ring gears 23 and 22 of which:

i. at least one is fixed
ii. at least one is free to rotate coaxially with the shaft 9;

At least one of the internal ring gears 23 and 22 is partially or totally contained in the space/volume portion, indicated with 401, of a cylinder having cylindrical surface tangent to and coaxial with the internal cavity of the stator and the two bases placed at the maximum axial size, according to the direction of the shaft 9, identified by the unit formed by the union of the stator 12, the winding 21 and the rotor 11. Such space portion 401 is clearly shown in the structural embodiment shown in FIG. 10.

In addition, the system comprises one or more devices with fixed gear or free wheel 8 and 7 that allow the transmission of the motion for only one mutual rotation sense of two rotating elements, of which at least one transmits the motion from the movable ring gear mobile 22 to the ring gears 2 of the secondary transmission 302.

The planetary gear sets are the following:

a. blocked Z11 (23)

b. The rotor 11 acts as a gear train case, through the flange 14 c. Z12 (10) and Z21 (29) are integral to form a planetary gear 18.

The system is always positioned outside the bottom bracket.

A fixed casing 15 which is connected to the frame of the vehicle 1 supports the stator 12.

The gear motor unit is positioned coaxially with the bottom bracket of the vehicle or, if the bottom bracket is not present, coaxially with the ring gears 2 of the secondary transmission.

According to two embodiments:

the shaft 9 bears pedal cranks 6 and 16, on which, pedals 4 may in turn be housed; such pedals are intended to collect the human muscular power delivered by the legs and/or arms; in such case, at least one device with fixed gear or free wheel 8 transmits the motion from the shaft 9 to the ring gears of the secondary transmission 302 the shaft 9 does not bear any pedal crank; in such case, the shaft 9 can be integrally fixed with the fixed casing 15.

As an alternative to the ring gears 2, other systems can be installed for the transmission of the motion to the wheel, such as by way of a non-limiting example: ring gears for toothed belts, ring gears for trapezoidal and/or flat belts, cardan transmission gear sets, hydrostatic transmission gear sets and any other type of system for transmitting the motion from a rotating shaft to a wheel.

The fast input shaft (201) transmits the motion to the rotor (11) and then to the gear train case (14) which rotates the planetary gear (18) composed of two integral gears: the first gear Z12 (10) of the planetary gear and the second gear of the planetary gear Z21 (29).

In the present invention, the internal ring gear Z11 (23) is fixed since it is integral with the fixed casing (15).

The rotor (11) is directly rotated by the electric motor according to the modes better described hereinbelow.

The wheel Z12 (10), due to the driving by the rotor flange 14 and the fixed internal ring gear Z11 (23) meshing, is rotated around its axis and revolves around the shaft (201), also making the wheel Z21 (29) integral therewith rotate at the same angular speed.

If the wheels have the same modulus, then the wheel Z21 (29) has a number of teeth different from that of Z12 (10) and in such case imparts a rotary motion to the ring gear Z22 (22), which in turn transmits the motion to the output shaft (202).

The transmission ration τ of the gear set thus composed is given by the formula:

$$\tau = 1 - \tau_0 = 1 - \frac{z_{11} \cdot z_{21}}{z_{12} \cdot z_{22}}$$

In which z11, z21, z12 and z22 are respectively the number of teeth of the wheels Z11 (23), Z21 (29), Z12 (10) and Z22 (22),

EXAMPLE 1

Still assuming that all the wheels have the same modulus and having:

Z11=77
Z12=21
Z21=20
Z22=76

According to the formula, there is a transmission ratio of about 0.035. Hence, by rotating the motor, and consequently the planetary gear case (14) at the speed of 4000 revolutions per minute, there is a speed of the output shaft (202) of about 4000×0.035=140 revolutions per minute.

The primary reduction ratio thus obtained is greater than 4000/140=28.5 to 1.

Hence, for every 28.5 revolutions of the primary shaft (201), there is only one revolution of the output shaft (202).

Such configuration couples the normal pedaling rhythm (from 70 to 140 revolutions per minute) with the maximum efficiency range of the motor (from 2000 to 4000 rpm), thus optimizing the efficiency of the system.

EXAMPLE 2

Still assuming that all the wheels have the same modulus and having:

Z11=144
Z12=42
Z21=41
Z22=143

There is a transmission ratio of about 0.017.

By rotating the motor, and consequently the planetary gear case (14) at the speed of 4000 revolutions per minute, there is a speed of the output shaft (202) of about 4000×0.017=68 revolutions per minute, hence the ratio between such speeds is greater than 4000/68=58 to 1.

Hence for every 58 revolutions of the primary shaft (201) there is only one revolution of the output shaft (202).

Comparing the reduction ratio obtained with the present invention to those obtainable by means of conventional epicyclic schemes, with one or more stages, described in the patents U.S. Pat. No. 6,296,072 (of about 8:1), EP20110187604 and EP2522567 A1 (of about 1:4), there is an increase of the torque of the output shaft greater than a factor that varies from 3 to 14 times. Such torque increase is exclusively due to the greater reduction ratio obtained, and thus does not yet consider the positive effects of the use of the particular motor conformation, better described hereinbelow.

The solution schematized in FIG. 4 allows obtaining reduction ratios comparable to those obtainable with non-coaxial solutions, while allowing much more limited bulk and greater efficiency of the transmission itself.

Object of the present invention is to obtain an electric gear motor unit for bicycles and tricycles, integrating the effectiveness of the above-described reduction system in an electric motor of "outrunner" type, and at the same time allowing for the possibility that the user can pedal, if desired; all of the above in an extremely compact solution, always for the purpose of obtaining the above-indicated objects.

Figure 5:
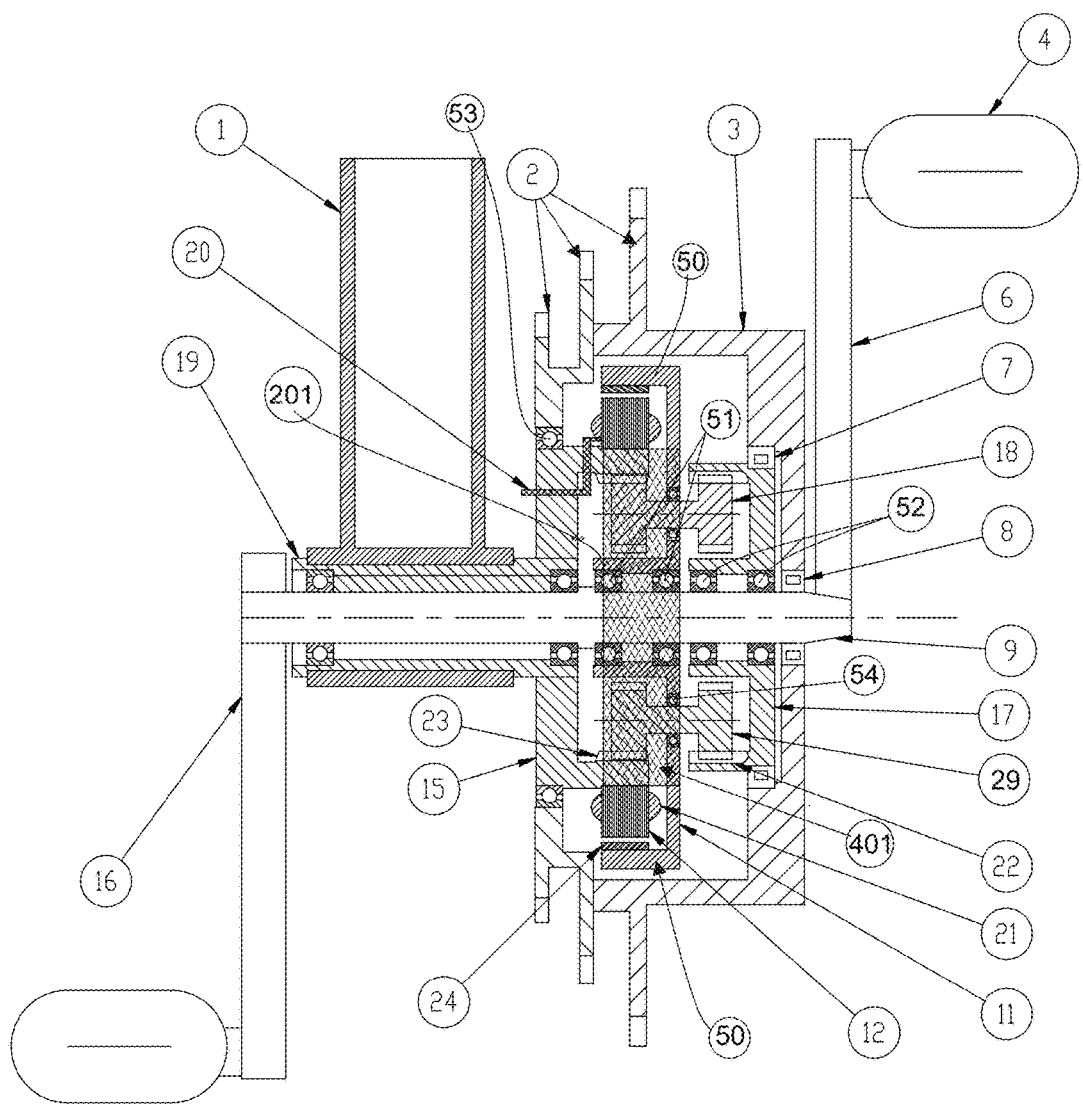
Figure 12:
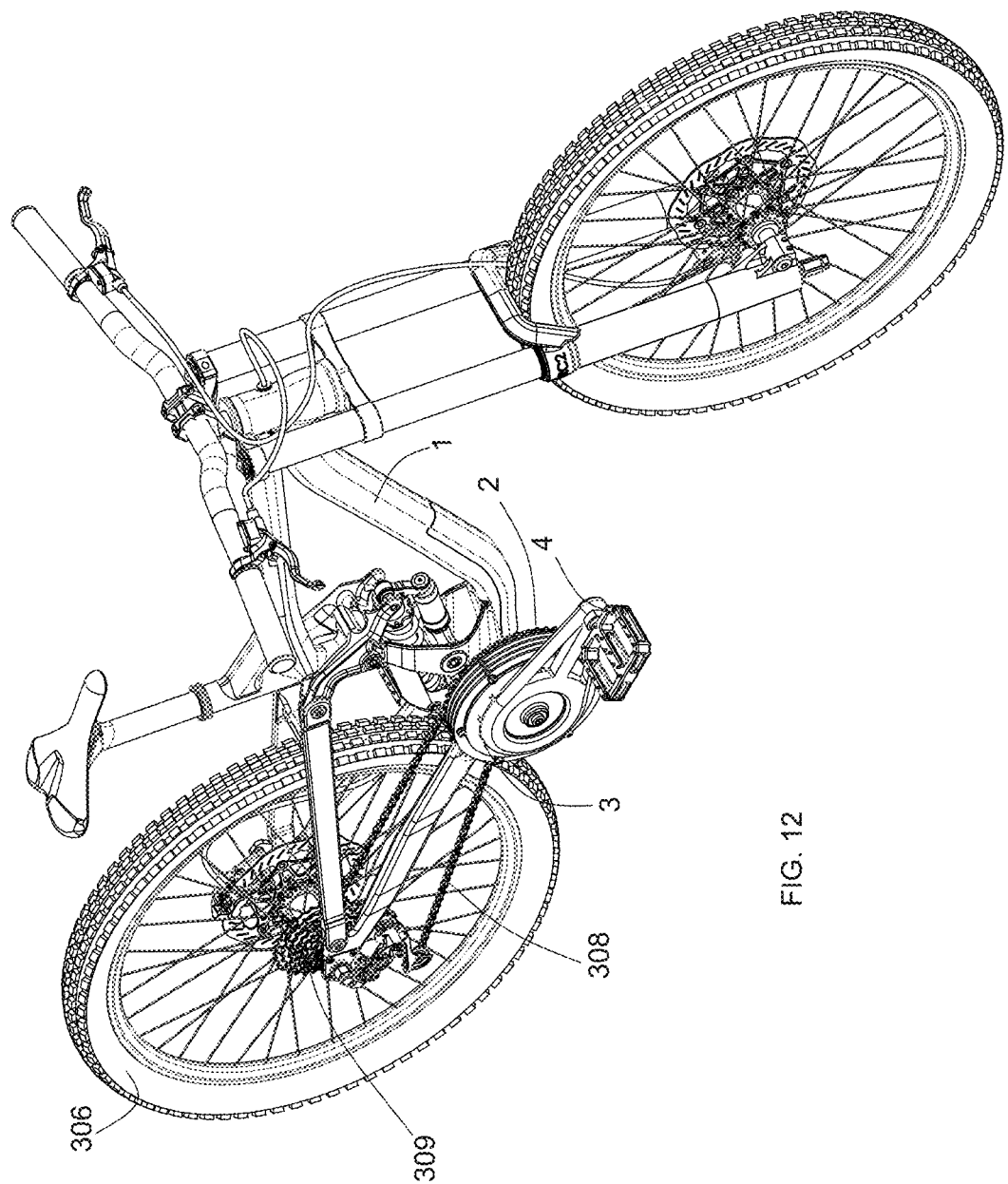
FIG. 12: illustrates a view of the system, object of the finding, in installation configuration outside the bottom bracket.

FIG. 5 is still a "configuration outside the bottom bracket" because the gear motor unit lies outside the bottom bracket, as illustrated in FIG. 12, ensuring the advantage of being able to apply the present invention, by way of a non-limiting example, also to frames of bicycles that were not created as electric vehicles, thus converting them from muscular propulsion vehicles to electric propulsion vehicles.

With reference to FIG. 5, the fixed casing 15 is also integral with the frame of the vehicle 1 by means of a hollow shaft whose external part is blocked within the bottom bracket of the vehicle, while the internal part of the shaft houses the bearings which allow the same shaft 9 to rotate.

Figure 8:
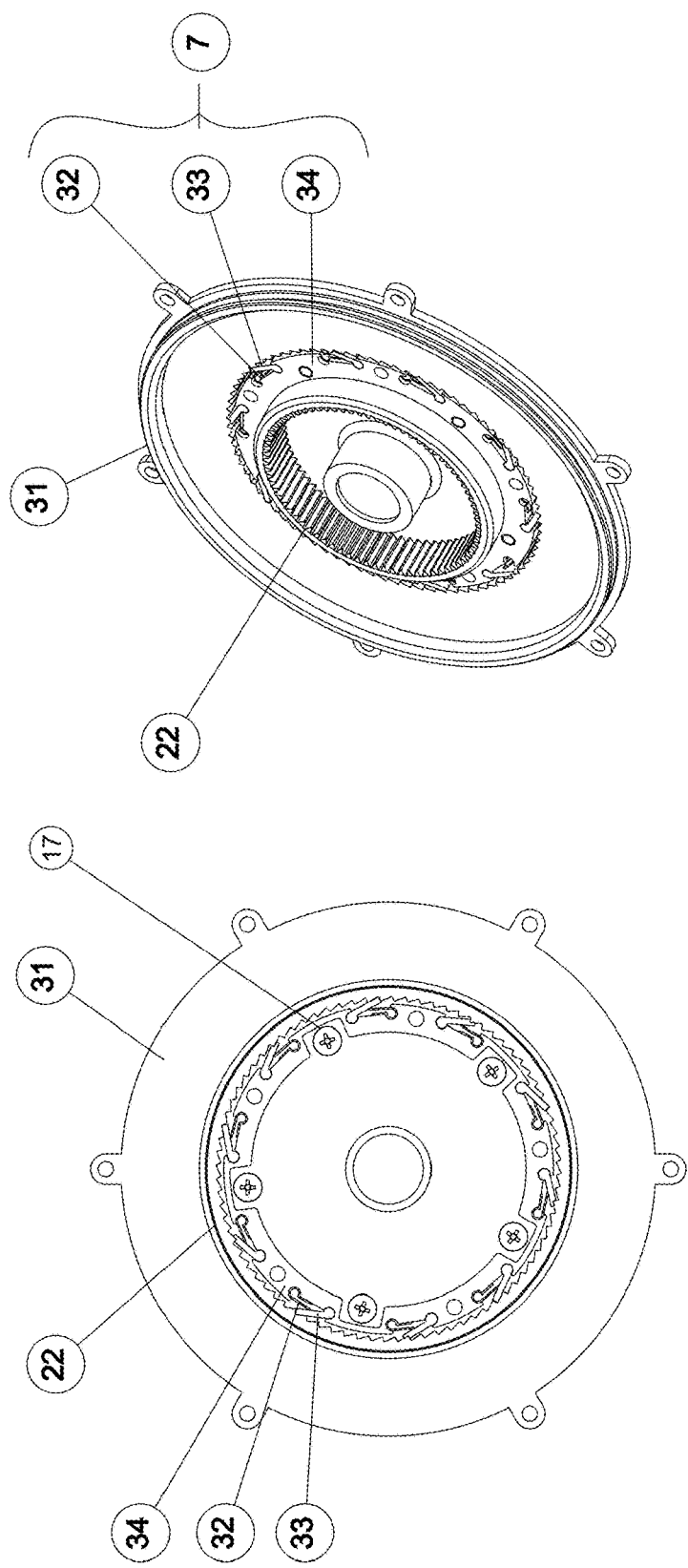
FIG. 8: illustrates a structural embodiment of the device for the unidirectional transmission of the motion (e.g. surplus joint or free wheel system)
Figure 9:
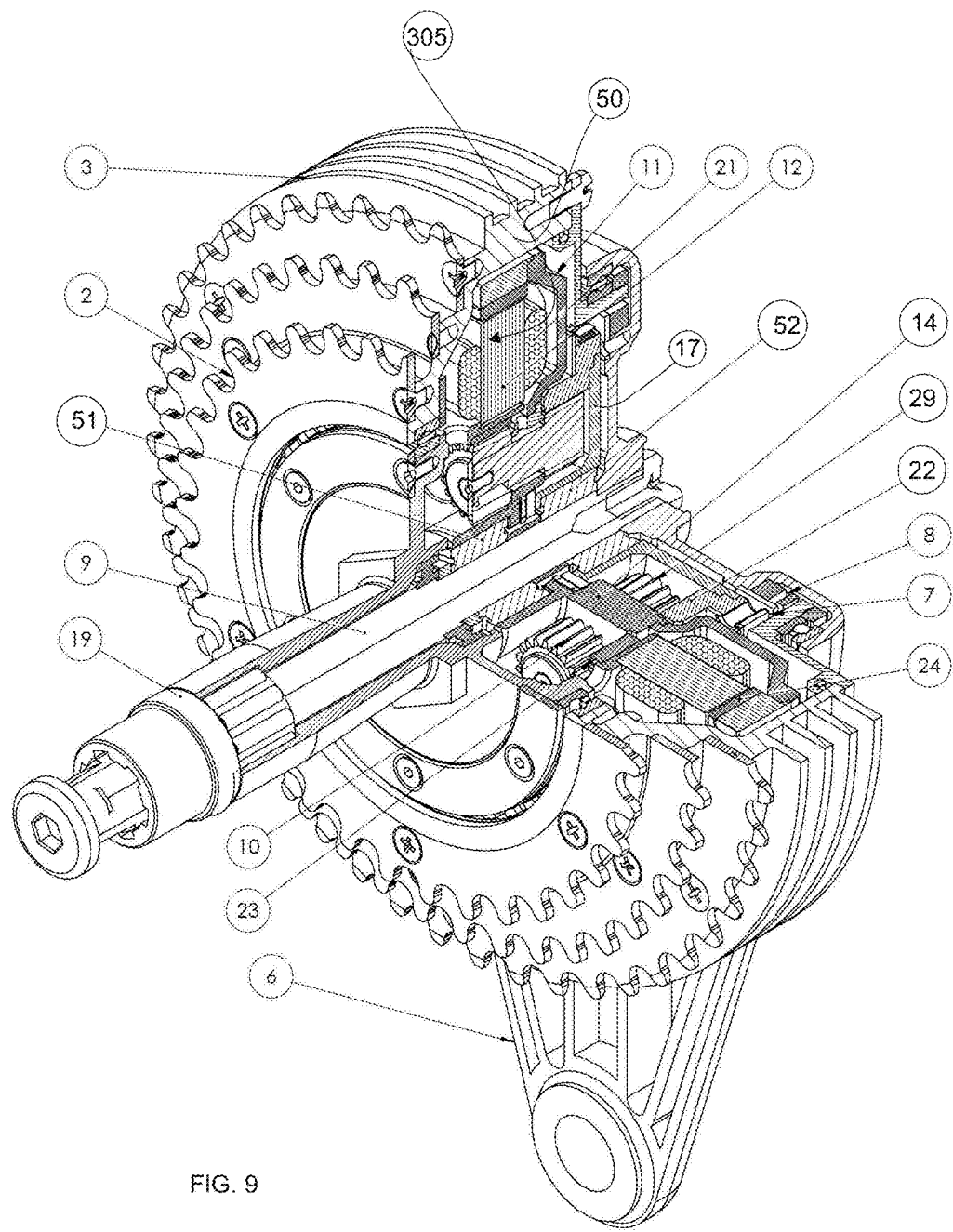
FIG. 9: is a structural embodiment for configuration outside the bottom bracket (axonometric section view)

One difference with respect to the internal configuration lies in the fact that the wheel 22 now transmits the motion to the movable casing 3 of the motor by means of the device, which allows the transmission of the unidirectional motion 7 (e.g. surplus joint or free wheel system, of which a possible structural mode is illustrated in FIG. 8).

The ring gears 2 for the secondary transmission 302 are arranged, in the embodiment, integral with the movable casing 3, which is free to rotate coaxially with 9, due to the turning or cylindrical pairs (53) (e.g. bearings or bushings) on 15 and on 9.

The movable casing 3 is now coupled to the hub 17 and shaft 9 by means of devices which allow the transmission of the unidirectional motion, indicated with 7 and 8 (e.g. surplus joint or free wheel system, see FIG. 8), in a manner such that the motion is transmitted from the hub 17 to the element 3 when the rotation speed of said element 17 is greater than or equal to that of the movable casing 3.

Analogously, the motion is transmitted from the shaft 9 to the casing 3 when the rotation speed of the shaft 9 is greater than or equal to that of the movable casing 3.

With reference to FIG. 8, the operation of the device is illustrated which allows the transmission of the unidirectional motion for the configuration outside the bottom bracket.

The hub 17 is integral with the ring gear 22 and can rotate coaxially with 9.

The cover 31 has an internal toothing and is fixed to the casing 3.

The shaped profile 34 is integral with the hub 17, and is created in a manner so to be able to house a plurality of teeth 33 which, pressed by means of a plurality of springs 32 against the internal toothing of 31, ensure that the motion can be transmitted from the hub 17 to the internal toothing 31 only when the hub 17 rotates with relative motion with respect to 31 in clockwise sense with reference to the first view of FIG. 8. In that case, in fact, the teeth are engaged in the cavities of 31, driving it.

On the contrary, when 17 and 34 rotate with counter-clockwise relative motion with respect to the toothing 31, the teeth 33 slide on the internal toothed profile, without being engaged in the cavities, hence preventing the transmission of the motion between the two elements 17 and 31 and thus consequently between the motor and the ring gears 2 of the secondary transmission 302.

Operation

For explanatory purposes, it is convenient to describe the operation of the present invention in three circumstances:

1) The drive power is only delivered by the electric motor,
2) The drive power is only delivered by the man by means of pedaling, via the pedals 4 and the pedal cranks 6 and 16,
3) The drive power is delivered both by the electric motor 305 and by the man by means the pedals 4 and the pedal cranks 6 and 16.

In the first case, the rotor (11) is thus rotated by the magnetomotive force generated by the magnetic field generated by the active parts of the electric motor 21, 12, 24.

The wheel Z12 (10), being engaged on the fixed internal ring gear Z11 (23), is simultaneously rotated around its axis and revolves around the shaft 9, also making the wheel Z21 (29) integral therewith rotate with the same motion.

The wheel Z21 (29), in the case of wheels with the same modulus, has a number of teeth different from that of Z12 (10) and imparts a rotary motion to the ring gear 22 around the shaft 9.

The ring gear 22 by means of the device 7, with the above-described modes, will transmit the motion to the ring gear case unit 41 (or to the casing 3 in the case of external configuration) and then to the ring gears 2, which in turn by means of the chain 308 will impart the motion to the wheel 306.

In the circumstance just described, the man will not provide power by means of the pedal 4 and pedal crank 16 and 6 system; hence, assuming for the sake of simplicity that the pedals do not rotate the shaft 9 will be stopped and the device 8 will operate in free rotation like a bearing, decoupling the motion of the ring gear case unit 41 (or the casing 3 in the case of external configuration) from that of the shaft.

In the second circumstance, in which the power is only delivered by man, the rotor (11) is stopped, hence so are the planetary gears 18, the ring gear 22 and the ring gear case hub 17. The pedal cranks 6 and 16 will rotate in counter-clockwise sense, from the perspective of FIG. 1, driving the shaft 9. The device 8 allows the transmission of the rotary motion to the ring gear case unit 41 (or to the casing 3 in the case of external configuration), and hence to the ring gears 2, which in turn, by means of the chain 308 will impart the motion to the wheel 306. The device 7 will operate in free rotation like a bearing, decoupling the motion of the ring gear case unit 41 (or of the casing 3 in the case of external configuration) from that of the ring gear case hub 17.

In the third operation circumstance, in which the power is delivered both by the man and by the gear motor unit, the drive torque is transmitted to the ring gear case unit 41 (or of the casing 3 in the case of external configuration) simultaneously by the motor and by the pedals, by means of the devices 7 and 8 which now prevent the mutual rotation of the parts to which they are coupled.

The pedals 6 and 16, the ring gear case unit 41 (or of the casing 3 in the case of external configuration) and the ring gear case hub 17 will rotate around the axis of the shaft 9 at the same rotation speed.

Final Considerations

The present invention thus combines the advantages of the architecture of the "outrunner" motor with those of the above-described integrated reduction system, generating drive torques on the ring gears 2 that are 4 to 40 times greater than those of the systems currently on the market, in an extremely compact and efficient solution.

The "mid-drive" solution thus allows exploiting such torque as a function of the needs, by means of the secondary transmission (302), which can further reduce or multiply the transmission ratio, for the purpose of allowing the motor to operate in the rotational conditions where there is optimal efficiency (e.g.: efficiency higher than 80% between 2000 and 4000 revolutions per minute).

Figure 7:
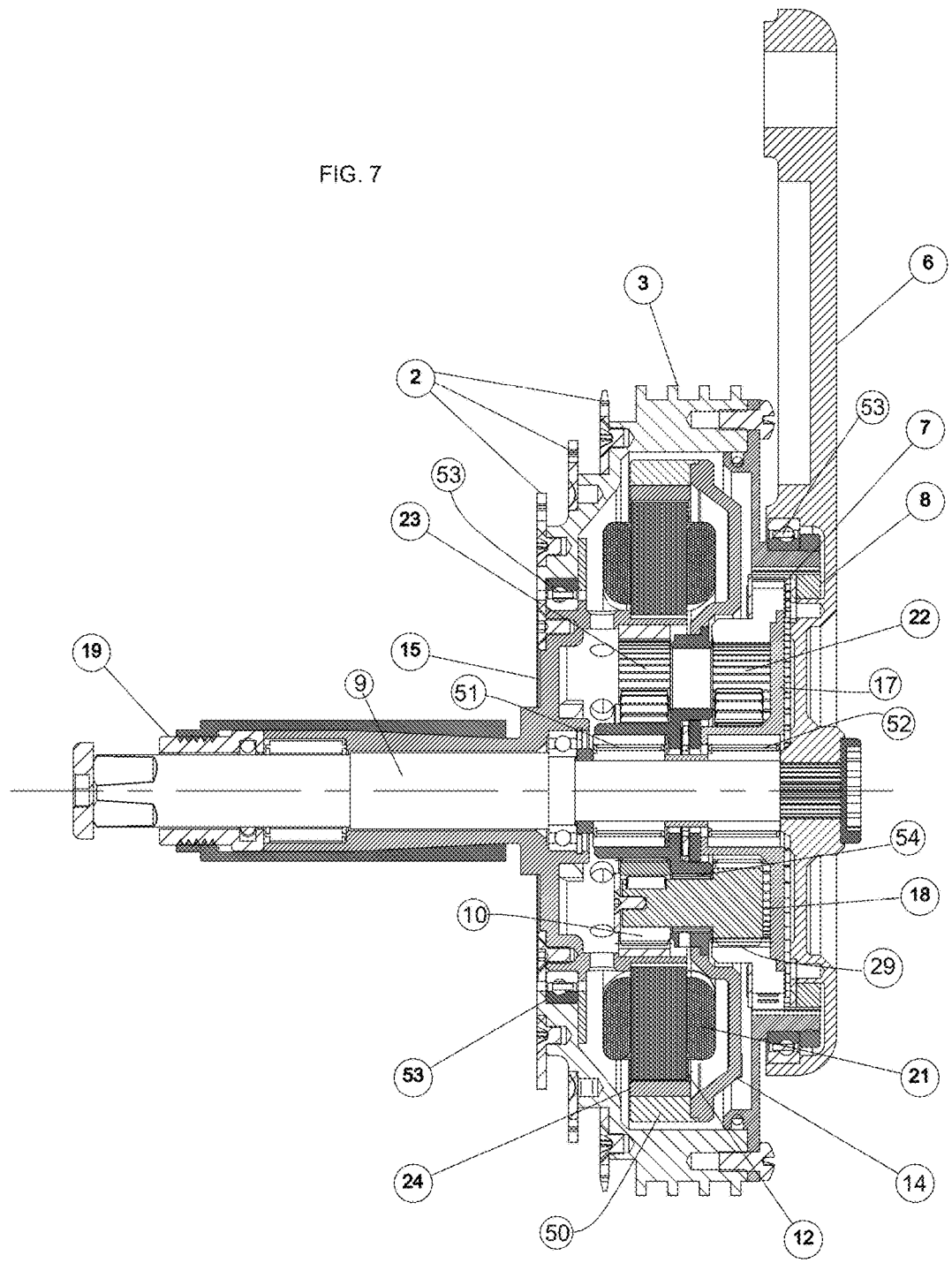
FIG. 7: is a structural embodiment for configuration outside the bottom bracket (plan section view)

In FIG. 7, it is possible to appreciate the limited bulk of an application example of the system. The represented solution allows delivering 1800 W, and a drive torque delivered by the motor on the order of 12 Nm continuous and 30 Nm peak, which together with the primary transmission with 10:1 reduction ratio, allows delivering a torque to the ring gears 2 on the order of 340 Nm continuous and 855 Nm peak, all with minimum bulk.

The external diameter can, for example, be less than the diameter of a standard ring gear with 52 teeth of the secondary transmission (of about 218 mm), the axial size can for example be on the order of 70 mm so as to be contained within the shape of a normal frame. In such example, the total volume of the gear motor unit, object of the present invention, would therefore be about 2.6 cubic decimeters, thus providing a continuous torque density (or "torque density") of about 340/2.6=130 Nm/dm^3 and 328 Nm/dm^3 peak. To give an idea of the importance of the result, the typical values will be outlined hereinbelow for the existing technologies.

A "direct hub" motor, hence lacking planetary reduction gears, given the same power supply voltage and current, requires a much greater volume (3.8 cubic decimeters) for obtaining less than half of the torque (130 Nm), yielding a continuous torque density of about 30-35 Nm/dm^3.

The motors of the "planetary hub" type, hence with planetary reduction gears in the primary transmission, due to the constraint of axial size (limited by the gear box), together with that of the diameter/length ratio of the electric motor, are characterized by a small size (volume of about 1.6 cubic decimeters) and are characterized by a continuous torque density greater than that of the versions lacking reduction: typical values for these motors approximate 40-45 Nm/dm^3. The bulk constraints, however, limit the maximum obtainable torques, which are less than 80 Nm. The non-coaxial "mid-drive" systems, like WO2008120311, must limit the oversize bulk and hence have limit volumes (in the specific case, less than 1 cubic decimeter) and due to their configuration are able to obtain high torque densities (in the current case 50 Nm/dm^3), never beyond however modest values of continuous torque: around 44 Nm to the ring gears of the primary transmission. The reduced torque values are due to the limited size required of the electric motors of these systems.

Coaxial "epicyclic mid-drive" systems within the frame have epicyclic stages and deliver performances that come closest to those of the present invention. The system of the type illustrated in the patent U.S. Pat. No. 6,296,072 provides a peak power of 850 W and 120 Nm (manufacturer data), due to an overall primary reduction ratio of about 32:1 given by two conventional epicyclic stages. Since the ratio between peak data and nominal data varies from 0.5 to 0.3 for a brushless motor, and assuming that in the current case it is 0.5, the power and torque values of the system described in the patent U.S. Pat. No. 6,296,072 are respectively 425 W and 60 Nm. These values, together with limited bulk (about 1 cubic decimeter) position this system at the top of the existing solutions, with a continuous torque density 56 Nm/dm^3 and 111 Nm/dm^3 peak.

Figure 13:
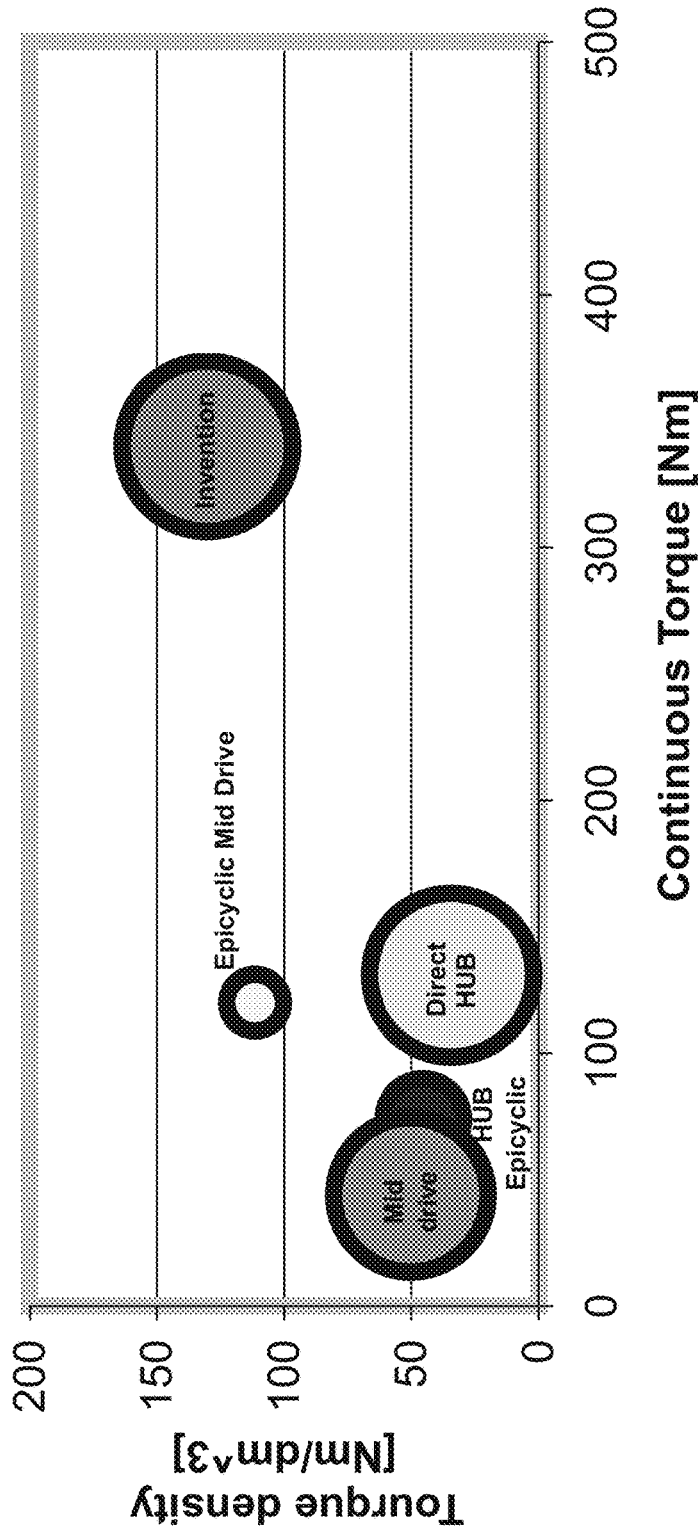
FIG. 13: illustrates a comparative graph of the performances of the existing technologies with respect to the object of the present invention.

Comparing the torque and torque density values (provided by the manufacturers themselves and by independent research institutes) of the existing technologies and the patents mentioned above with the values obtainable with the object of the present invention of 130 Nm/dm^3 continuous and 328 Nm/dm^3 peak for a delivered continuous torque (continuous service S1) of 340 Nm, the advantage of the present invention emerges quite clearly, as is graphically represented in FIG. 13. Indeed, by using small portions of the available torque, there will be low absorptions of current and hence greater efficiency that is translated into a greater autonomy given the same battery pack capacity. The high available torque makes it possible to confront very steep ascents (e.g. 30% slope) which, by exploiting the high primary reduction ratio, can be traveled while maintaining the motor in the revolution range of maximum efficiency. Due to the secondary transmission, it is then possible to "extend" the ratio so as to translate the available power into speed, always maintaining the motor in optimal operation conditions.

INDEX OF THE REFERENCE NUMBERS 1, 101—Frame bicycle
2, 102—Ring gears for chain transmission
3, 103—Movable casing
4—Pedal
6, 106—Right pedal crank 7, 107—Member for the unidirectional motion transmission (e.g.: surplus joint or free wheel with clip) for the transmission of the motion from the motor to the casing 8, 108—Member for the unidirectional motion transmission (e.g.: surplus joint or free wheel with clip) for the transmission of the motion from the shaft of the bottom bracket to the casing 9, 109—Shaft bottom bracket 10—Planetary gear Z12

11—Rotor 12, 112—Stator pack 14, 114—Rotor flange or planetary gear case or train case 15—Fixed casing 16, 116—Left pedal crank 17—Hub of the ring gear with internal toothing Z22

18, 118—Planetary gear composed of gears Z12 (10) and Z21 (29)

19, 119—Fixed tube of the bottom bracket

20—Wire output for the motor power supply 21, 121—Stator winding heads

22-Z22—ring gear with internal toothing of the final reduction stage

23-Z11—ring gear with internal toothing of the first reduction stage 24, 124—Rotor magnets 29—Planetary gear Z21

31—Cover for the gear motor system

32—Plurality of springs for compression of the teeth of the unidirectional motion transmission member 33—Plurality of teeth of the unidirectional motion transmission member 34—Shaped profile of the unidirectional motion transmission member 41—Ring gear case unit 50—Magnet-carrier rotor ring gear 51—Turning pairs for supporting the rotor 11

52—Turning pairs for supporting the final stage 17 of the gear box

53—Turning pairs for supporting the initial stage of the secondary transmission

5t4—Turning pairs for supporting planetary gears 18

201—Quick motion input shaft of the gear box

202—Slow shaft for the output of the motion from the gear box

302—Secondary transmission

305—Electric motor

306—Rear wheel of the vehicle

308—Chain of the secondary transmission

309—Ring gears placed at the wheel of the vehicle

401—Volume of a hypothetical cylinder within which one or more internal toothed wheels of the primary transmission are nested 123—Internal toothing of the planetary gear box 150—Rotor ring gear 151—Cup, ring gear for all the reduction stages 152—Final-stage planetary gear case 155—Cylindrical body of the final-stage planetary gear case 156—Flange with hole 154

153—Front connections 107A, 108A—Front teeth 107B, 108B—Radial teeth

103A—Grooved profile of the element 103

160—Toothed element

170—Square seat 161

170—Spring

The invention claimed is:

1. An electric gear motor system for vehicles with two or three wheels, said vehicles including a bicycle frame with pedal cranks for transmission of advancing motion of a vehicle, said gear motor system comprising:
a motor having a rotor outside a stator, the motor being installed coaxially with a bottom bracket of the bicycle frame and comprising a planetary gear box, nested inside a stator cavity, the system being installed coaxially with the bottom bracket of the bicycle frame, by a hub configured to be inserted in cavities of bottom brackets of bicycle frames, such that a revolution axis of the motor, a main axis of the planetary gear box, and a pedal crank shaft coincide, the motor and the planetary gear box being outside the frame,
wherein an output motion planetary gear box is transmitted to a rotating bell-shaped element within which the motor and the planetary gear box are fully housed.

2. The system according to claim 1, wherein ring gears are fixed to the rotating bell-shaped element and are configured to secondarily transmit the motion.

3. The system according to claim 1, wherein a cup is integral on one side with the bicycle frame, the cup acting externally on the other side thereof as a support of the stator and internally as an internal toothing of the planetary gear box.

4. The system according to claim 1, wherein the planetary gear box comprises multiple stages of planetary gears and sun gears, the motion exiting from the gear motor system by a final-stage hollow planetary gear case that rotates inside the sun gears of preceding stages, a pedal shaft rotating within said planetary gear case.

5. The system according to claim 4, wherein said planetary gear case has a front toothing configured to unidirectionally transmit motion by coupling with a toothed ring.

6. The system according to claim 5, further comprising another toothed ring next to said toothed ring, both toothed rings being axially and radially provided with teeth, both toothed rings being configured to slide along the pedal shaft and being held compressed by an elastic element configured to maintain the toothed rings in contact against the front toothing of the planetary gear case.

7. The system according to claim 6, wherein the teeth of the toothed rings are arranged mirror-like, such that when the gear motor system rotates, the toothed ring coupled with the planetary gear case is configured to mesh with the second-stage planetary gear case, and
the toothed ring coupled with the planetary gear case is configured to drive ring gears of the vehicle and the other toothed ring rotates freely due to continuous engagement of the toothed ring with an external casing.

8. The system according to claim 5, wherein the motion is transmitted from the pedal cranks to the pedal crank shaft and from the pedal crank shaft by a front connection of an element with a square seat to the other toothed ring and to the rotating bell-shaped element.

9. A vehicle with two and/or three wheels, comprising:
the gear motor system according to claim 1, said system being positioned outside a bottom bracket of the vehicle.

10. A vehicle with two and/or three wheels, comprising:
the gear motor system according to claim 4, said system being positioned outside a bottom bracket of the vehicle.

11. An electric gear motor system for vehicles with two or three wheels, said vehicles including a bicycle frame with pedal cranks for transmission of advancing motion of a vehicle, said gear motor system comprising:
- a motor having a rotor outside a stator, the motor being installed coaxially with a bottom bracket of the bicycle frame and comprising a planetary gear box, nested inside a stator cavity, the system being installed coaxially with the bottom bracket of the bicycle frame by a hub configured to be inserted in cavities of bottom brackets of bicycle frames, such that a revolution axis of the motor, a main axis of the planetary gear box, and a pedal crank shaft coincide, the motor and the planetary gear box being outside the frame,
- wherein the planetary gear box comprises multiple stages of planetary gears and sun gears, the motion exiting from the gear motor system through a final-stage hollow planetary gear case that rotates inside the sun gears of preceding stages of the planetary gear box, a pedal shaft rotating within said planetary gear case.

12. The system according to claim 11, wherein ring gears are fixed to the rotating bell-shaped element and are configured to secondarily transmit the motion.

13. The system according to claim 11, wherein a cup is integral on one side with the bicycle frame, the cup acting externally on the other side thereof as a support of the stator and internally as an internal toothing of the planetary gear box.

14. The system according to claim 11, wherein an output motion of the planetary gear box is transmitted to a rotating bell-shaped element within which the motor and the planetary gear box are fully housed.

15. The system according to claim 11, wherein said planetary gear case has a front toothing configured to unidirectionally transmit the motion by coupling with a toothed ring.

16. The system according to claim 15, further comprising another toothed ring next to said toothed ring, both toothed rings being axially and radially provided with teeth, both toothed ring being configured to slide along the pedal shaft and being held compressed by an elastic element configured to maintain the toothed rings in contact against the front toothing of the planetary gear case.

17. The system according to claim 16, wherein the teeth of the toothed rings are arranged mirror-like, such that when the gear motor system rotates, the toothed ring coupled with the planetary gear case is configured to mesh with the second-stage planetary gear case, and
the toothed ring coupled with the planetary gear case is configured to drive ring gears of the vehicle and the other toothed ring rotates freely due to continuous engagement of the toothed ring with an external casing.

18. The system according to claim 16, wherein the motion is transmitted from the pedal cranks to the pedal crank shaft and from the pedal crank shaft by a front connection of an element with a square seat to the other toothed ring and to the rotating bell-shaped element.

19. A vehicle with two and/or three wheels comprising:
the gear motor system according to claim 11, said system being positioned outside a bottom bracket of the vehicle.

20. A vehicle with two and/or three wheels comprising:
- an electric gear motor system for vehicles with two or three wheels, said vehicles including a bicycle frame with pedal cranks for transmission of advancing motion of the vehicle, said gear motor system comprising
- a motor having a rotor outside a stator, the motor being installed coaxially with a bottom bracket of the bicycle frame and comprising a planetary gear box, nested inside a stator cavity, the system being installed coaxially with the bottom bracket of the bicycle frame by a hub configured to be inserted in cavities of bottom brackets of bicycle frames, such that a revolution axis of the motor, a main axis of the planetary gear box, and a pedal crank shaft coincide, the motor and the planetary gear box being outside the frame,
- wherein the system is positioned outside a bottom bracket of the vehicle.

* * * * *